Sept. 1, 1942.  W. NELSON  2,294,685
KNURLING TOOL
Filed May 19, 1941   2 Sheets-Sheet 1
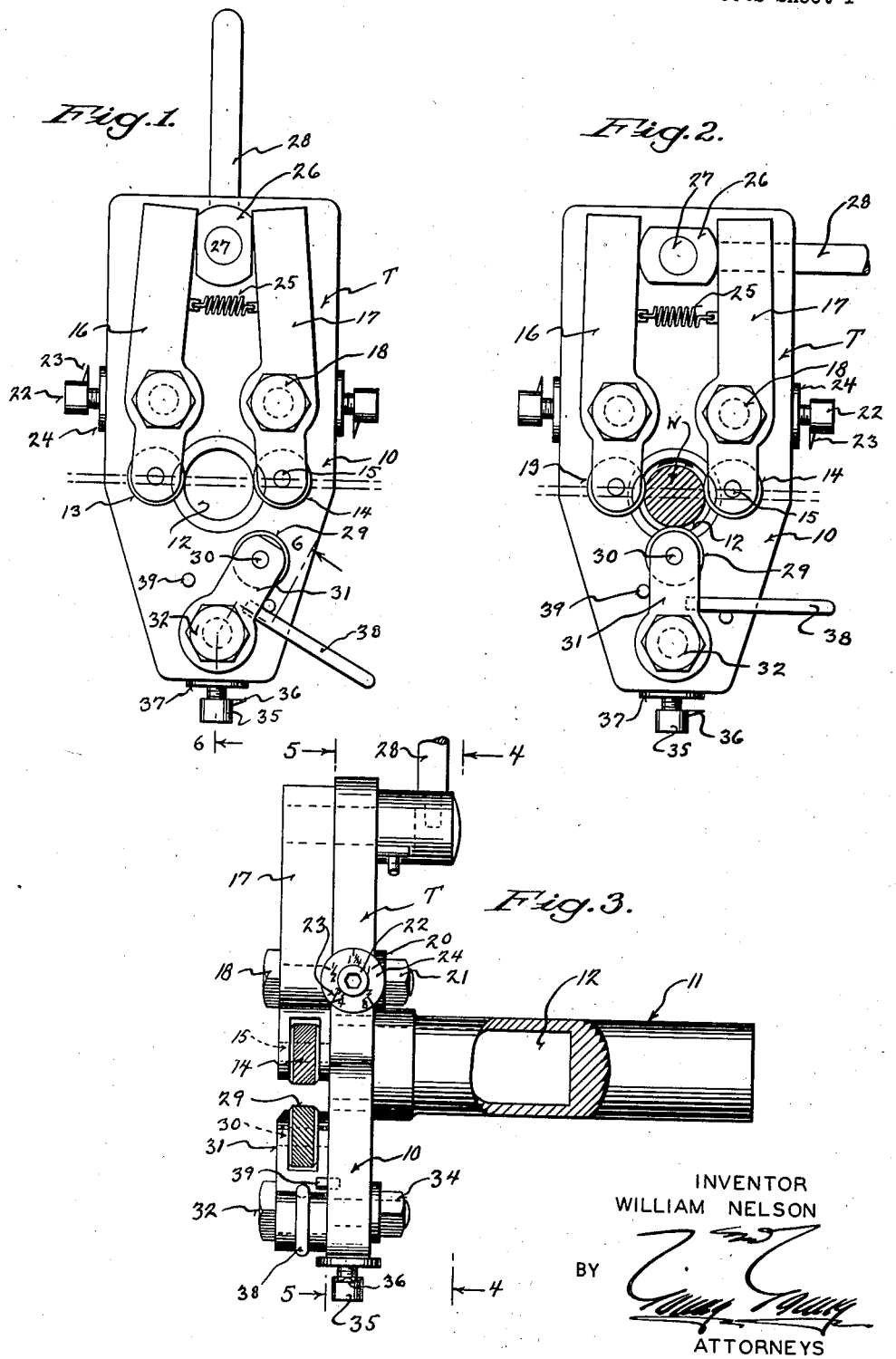
INVENTOR
WILLIAM NELSON
BY
ATTORNEYS

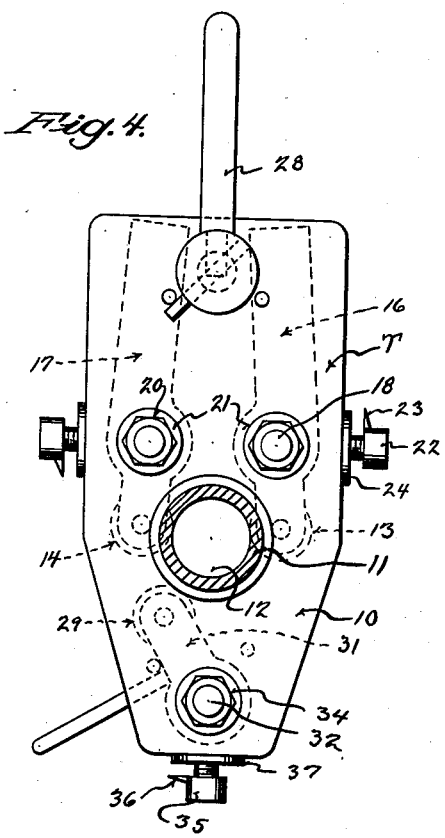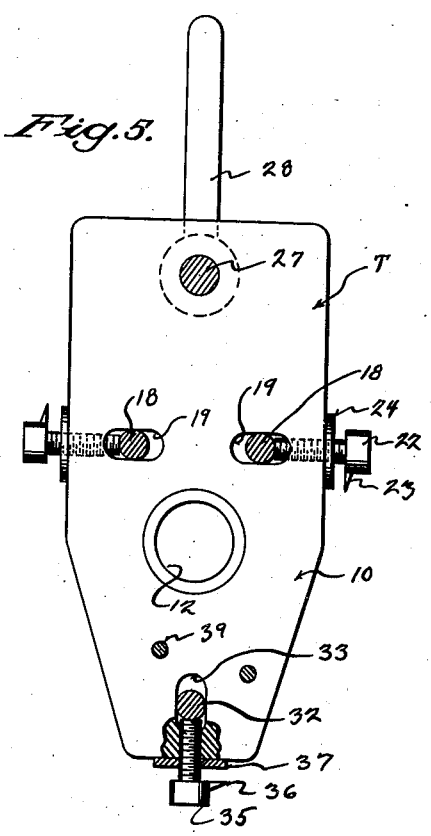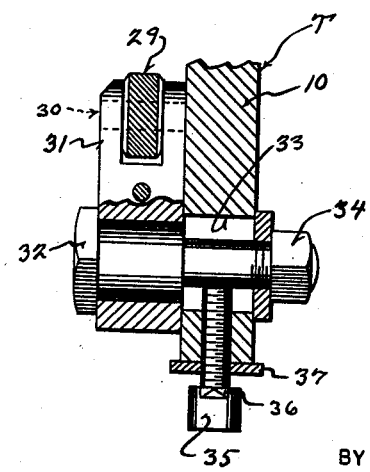

Patented Sept. 1, 1942

2,294,685

UNITED STATES PATENT OFFICE 2,294,685

KNURLING TOOL

William Nelson, Racine, Wis., assignor to Racine Universal Motor Company, Racine, Wis.

Application May 19, 1941, Serial No. 394,125

2 Claims. (Cl. 80—5.1)

This invention appertains to metal working, and more particularly to a novel knurling tool.

Knurling tools generally consist of a head or body for receiving the free end of the work or stock, and this head or body carries two or more knurling rolls movable into and out of engagement with the work or stock. During the rotation of the work relative to the head, the knurling rolls tend to climb or crawl over the work, and many pieces of work are spoiled by this crawling action of the rolls, which throws the knurling cuts on the work or stock out of proper line.

It is, therefore, one of the primary objects of my invention to provide novel means for arranging the knurling rollers on the head of the tool in such a manner whereby the tendency of the rolls to climb over the work or stock during the rotation of the stock is eliminated, thereby effectively preventing the ruining of the work or stock from this cause.

Another salient object of my invention is to provide a knurling tool embodying a pair of knurling rolls arranged in transverse alinement on the head and off-center relative to the axis of the work and on opposite sides of the work, whereby to steady the work and head relative to one another and thus prevent the crawling of the rolls over the work.

A further object of my invention is to provide novel means for mounting the knurling rolls, which are in transverse alinement, on the inner ends of supporting levers, which are, in turn, rockable intermediate their ends on the head and beyond the longitudinal axis of the work or stock.

A further important object of my invention is to provide a steady knurling roll for the work carried by the head and arranged between the knurling rolls, which are in transverse alinement, whereby to engage the work between said last-mentioned rolls and thereby form an effective support for the work.

A still further object of my invention is to provide novel means for adjustably mounting all of the carriers for the knurling rolls on the head, whereby different sizes of stock can be effectively taken care of.

With these and other objects in view, the invention consists in the novel construction, arrangement, and formation of parts, as will be hereinafter more specifically described, claimed, and illustrated in the accompanying drawings, in which drawings:

Figure 1 is a front elevational view of my improved tool, showing the knurling rolls in position for receiving the work or stock to be knurled.

Figure 2 is a view similar to Figure 1, but showing the knurling rolls in their operative position for engaging the work.

Figure 3 is a side elevational view of the tool, with parts thereof broken away and in section.

Figure 4 is a rear elevational view of the tool, showing the shank thereof in section, the section being taken on the line 4—4 of Figure 3.

Figure 5 is a sectional view through the tool, taken on the line 5—5 of Figure 3, looking in the direction of the arrows, illustrating the means for holding the knurling rolls in an adjusted position relative to the work.

Figure 6 is an enlarged, detail, fragmentary, sectional view taken on the line 6—6 of Figure 1, looking in the direction of the arrows, illustrating the adjusting means for the steadying knurling roll.

Referring to the drawings in detail, wherein similar reference characters designate corresponding parts throughout the several views, the letter T generally indicates my improved knurling tool, and the same includes a head 10 having a rearwardly extending shank 11 for fitting in the chuck of a tailstock or turret of a lathe or screw machine or similar device. The shank and head are provided with an opening or bore 12 to permit the work to pass into the shank, when necessary.

The head 10 can be in the nature of a flat plate having a shape best suited for the character of the work intended. The knurling rolls are carried by the front face of the plate, while the shank 11 extends rearwardly from the plate.

In accordance with my invention, I provide knurling rolls 13 and 14 arranged in transverse alinement on the head and on opposite sides of the head and the opening or bore 12. These knurling rolls 13 and 14 are rotatably mounted on bearing pins 15 carried by the inner ends of supporting levers 16 and 17. These levers 16 and 17 are rockably mounted intermediate their ends on pivot bolts 18, and these pivot bolts 18 extend through transversely extending slots 19 formed in the plate or head 10. The rear ends of the pivot bolts 18 have fitted thereon washers 20 and holding nuts 21. Thus, the pivot bolts 18 can be securely fastened on the head. In order to hold the pivot bolts in an adjusted position for the particular size of the work being operated upon, the edges of the head or plate 10 have threaded therein adjusting screws 22. The inner ends of these adjusting screws 22 extend into the slots 19 and bear against the pivot bolts 18. If preferred, the heads of the adjusting screws 22 can carry pointers 23 for cooperation with dials 24 on the edges of the head. These dials can carry suitable indicia to indicate the position of the screws 22 for certain sizes of the work.

The levers 16 and 17 are connected adjacent their upper ends by a contractile coil spring 25. Hence, this contractile coil spring tends to swing the levers on their pivot bolts with the knurling rolls 13 and 14 away from the work. Any preferred means can be provided for forcibly urging the rolls 13 and 14 into engagement with the work, and for the purpose of illustration, I have shown this means to consist of a cam 26. The cam 26 can be securely fastened to a shaft 27 rotatably carried by the head 10 between the outer ends of the levers 16 and 17. A hand lever 28 is fastened to the shaft 27 to move the cam into its operative and inoperative positions.

Particular attention is now invited to the fact that the axial centers of the knurling rolls 13 and 14 extend beyond the axial center of the bore 12 and the axial center of the work received between the rolls. That is, the rolls 13 and 14 are so disposed that the same are offcenter relative to the axis of the work.

In conjunction with the knurling rolls 13 and 14, I also employ a steadying knurling roll 29. This steadying knurling roll 29 is arranged between the rolls 13 and 14 and is rotatably mounted on a bearing pin 30. The bearing pin 30 is carried by the inner end of a swinging lever 31. This swinging lever is rockably mounted, at its outer end, on a pivot bolt 32, which extends through the plate or head 10. The pivot bolt 32 is of the same character as the pivot bolts 18, and, hence, the bolt 32 extends through a slot 33 formed in the head 10. This slot 33 extends longitudinally of the head, so that the pivot bolt can be adjusted toward and away from the opening or bore 12. A retaining nut 34 is also fitted on this pivot bolt 32, and the bolt is held in a desired adjusted position by means of an adjusting screw 35 carried by the head or plate 10. The adjusting screw extends into the slot 33 and engages the pivot bolt.

The head of the adjusting screw 35 can carry an indicating pointer 36, which can cooperate with a dial 37 carried by the plate, and this dial is marked similar to the dials 24 for indicating the position of the screw 35 for different sizes of work.

The lever 31 also carries an outwardly extending fingerpiece or handle 38 by means of which the knurling roll 29 can be moved into and out of engagement with the work. The lever 31 is limited in its swinging movement in both directions by means of stop pins 39 fastened to the plate or head 10.

By referring to Figure 2, it will be noted that the work, indicated by the reference character W, rotates in a clockwise direction, and, hence, when the knurling roll 29 is moved into engagement with the work, the rotation of the work will tend to hold this knurling roll in operative position.

In use of my tool, the knurling rolls 13, 14, and 29 are initially swung to their inoperative positions, as shown in Figure 1, and when the work W is moved toward the head and between the rolls, the lever 28 is swung down so as to spread the outer ends of the levers 16 and 17 and, thus, swing in on the inner ends of the levers to move the rolls 13 and 14 into work-engaging position. The handle 38 is then moved inwardly, which will swing the roll 29 into work-engaging position. As this roll 29 lies between the knurling rolls 13 and 14, the roll 29 tends to steady the work and prevent the chattering thereof relative to the tool. As the rolls 13 and 14 are offcenter and beyond the longitudinal axis of the work and on opposite sides of the work, these rolls will not have any tendency to crawl over the work, and the work will be held properly centered in the bore of the shank. Thus, the correct knurling action will take place, and the danger of spoiling work is reduced to a minimum.

Changes in details may be made, which do not depart from the spirit and scope of my claims, and what I claim as new is:

1. A knurling tool comprising, a head, a shank carried by said head, the head and shank having an opening for receiving the work, a pair of levers rockably mounted intermediate their ends on one side of the opening, independent knurling rolls rotatably carried by the inner ends of the levers, said rolls being arranged in transverse alinement relative to the head with their axis at one side of the diametric center of the opening, means for operating the levers for moving the rolls into and out of operative position, a swinging lever mounted on the head on the opposite side thereof from the pivots of the first-mentioned levers, a knurling roll carried by the inner end of the last-mentioned lever, means for swinging the last-mentioned lever for moving the knurling roll carried thereby into and out of work-engaging position, said last-mentioned knurling roll being arranged between the two first-mentioned knurling rolls when the rolls are in their operative work-engaging position.

2. A knurling tool comprising, a head, a shank carried by said head, the head and shank having an opening for receiving the work, a pair of levers rockably mounted intermediate their ends on one side of the opening, independent knurling rolls rotatably carried by the inner ends of the levers, said rolls being arranged in transverse alinement relative to the head with their axis at one side of the diametric center of the opening, means for operating the levers for moving the rolls into and out of operative position, a swinging lever mounted on the head on the opposite side thereof from the pivots of the first-mentioned levers, a knurling roll carried by the inner end of the last-mentioned lever, means for swinging the last-mentioned lever for moving the knurling roll carried thereby into and out of work-engaging position, said last-mentioned knurling roll being arranged between the two first-mentioned knurling rolls when the rolls are in their operative work-engaging position, and means for adjusting the pivots of all of the levers toward the opening.

WILLIAM NELSON.